United States Patent
Taylor

(10) Patent No.: US 12,515,791 B2
(45) Date of Patent: Jan. 6, 2026

(54) VERTICAL TAKE-OFF BOX WING AIRCRAFT

(71) Applicant: Wind Craft Aviation Inc., Lowell, MI (US)

(72) Inventor: Alexander James Taylor, Lowell, MI (US)

(73) Assignee: Orb Aerospace, Inc., Lowell, MI (US)

( * ) Notice: Subject to any disclaimer, the term of this patent is extended or adjusted under 35 U.S.C. 154(b) by 0 days.

(21) Appl. No.: 18/044,302

(22) PCT Filed: Sep. 9, 2021

(86) PCT No.: PCT/IB2021/058223
§ 371 (c)(1),
(2) Date: Mar. 7, 2023

(87) PCT Pub. No.: WO2022/053984
PCT Pub. Date: Mar. 17, 2022

(65) Prior Publication Data
US 2024/0300644 A1    Sep. 12, 2024

Related U.S. Application Data

(60) Provisional application No. 63/077,260, filed on Sep. 11, 2020.

(51) Int. Cl.
*B64C 29/00*     (2006.01)
*B64C 3/16*      (2006.01)
(Continued)

(52) U.S. Cl.
CPC ............ *B64C 29/0033* (2013.01); *B64C 3/16* (2013.01); *B64C 39/068* (2013.01); *B64C 11/48* (2013.01)

(58) Field of Classification Search
CPC ... B64C 29/0033; B64C 39/06; B64C 39/062; B64C 39/068; B64C 39/08
See application file for complete search history.

(56) References Cited

U.S. PATENT DOCUMENTS 3,985,317 A    10/1976    Geraci et al.
5,503,352 A    4/1996     Eger
(Continued)

FOREIGN PATENT DOCUMENTS

| | | |
|---|---|---|
| FR | 3064978 A1 | 10/2018 |
| WO | 2015019255 A1 | 2/2015 |
| WO | 2020069582 A1 | 4/2020 |

OTHER PUBLICATIONS

ISA/US; International Search Report and Written Opinion; Dec. 14, 2021; entire document.

*Primary Examiner* — Timothy D Collins
*Assistant Examiner* — Terri L Filosi
(74) *Attorney, Agent, or Firm* — Price Heneveld LLP

(57) ABSTRACT

An aircraft frame includes a fuselage, at least one boom and a wing structure including a first lifting surface having a first root portion located proximate the at least one boom and a first tip portion where at least a portion of the first tip portion is located forwardly from at least a portion of the first root portion, a second lifting surface having a second root portion located proximate the fuselage, and a second tip portion located spaced from the first tip portion where at least a portion of the second tip portion is located rearwardly from at least a portion of the second root portion, and a connector surface extending between the first and second tip portions.

23 Claims, 12 Drawing Sheets

(51) Int. Cl.
 *B64C 39/06* (2006.01)
 *B64C 11/48* (2006.01)

(56) References Cited

U.S. PATENT DOCUMENTS

| | | |
|---|---|---|
| 9,499,266 B1 | 11/2016 | Garreau |
| 10,450,062 B1* | 10/2019 | Bova ..................... B64U 30/10 |
| 2014/0061367 A1 | 3/2014 | Fink et al. |
| 2018/0208305 A1* | 7/2018 | Lloyd .................... B60L 50/90 |
| 2019/0135424 A1* | 5/2019 | Baity ..................... B64U 20/77 |
| 2020/0010209 A1* | 1/2020 | Bender .................... F28D 1/02 |
| 2020/0140072 A1 | 5/2020 | Blacha |

* cited by examiner

VERTICAL TAKE-OFF BOX WING AIRCRAFT

CROSS-REFERENCE TO RELATED APPLICATIONS

This application priority to International Application Number PCT/IB2021/058223, entitled "VERTICAL TAKE-OFF BOX WING AIRCRAFT," filed Sep. 9, 2021, which claims priority to U.S. Provisional Patent Application No. 63/077,260, entitled "VERTICAL TAKE-OFF BOX WING AIRCRAFT," filed Sep. 11, 2020, is a continuation-in-part of U.S. Design patent application Ser. No. 29/750,236, entitled "AIRCRAFT," filed Sep. 11, 2020, and is a continuation-in-part of U.S. Design patent application Ser. No. 29/750,242, entitled "WING STRUCTURE," filed Sep. 11, 2020, the entire disclosures of which are incorporated herein by reference.

BACKGROUND OF THE INVENTION

Vertical take-off, electric aviation is a quickly developing facet of aerospace with many key players making unique alterations to the design of their airframes to gain an operating advantage. The design of an aircrafts' structure in this field is even more critical due to the interdependent nature of an electric vertical take-off and landing (EVTOL) aircrafts' airframe and powerplant positioning for function and stability.

The design of an airframe is critical to facilitating necessary forward and vertical flight characteristics. In addition the placement of propulsion within the airframe to take off and land vertically is equally critical.

BRIEF SUMMARY OF THE INVENTION

The present invention relates to a vertical take-off and landing aircraft, and in particular to a vertical take-off and landing aircraft comprising box wing airfoils and an electric powerplant.

One embodiment as shown and described herein may include an aircraft frame than includes a fuselage having a forward end and a rearward end, at least one boom having a first end coupled to the rearward end of the fuselage and a second end extending rearward from the first end, and a wing structure. The wing structure may include a first lifting surface having a first root portion located proximate the at least one boom, and a first tip portion located distally from the first root portion, wherein at least a portion of the first tip portion of the first lifting surface is located forwardly from at least a portion of the first root portion of the first lifting surface, a second lifting surface having a second root portion located proximate the fuselage, and a second tip portion located distally from the second root portion, wherein at least a portion of the second tip portion of the second lifting surface is located rearwardly from at least a portion of the second root portion of the second lifting surface, and wherein the second tip portion is spaced from the first tip portion, and a connector surface extending between the first tip portion and the second tip portion.

Another embodiment as shown and described herein may further or alternatively include an aircraft that includes an aircraft structure including an aircraft body including a fuselage having a forward end and a rearward end, and a wing structure including a first lifting surface having a first root portion located proximate the aircraft body, and a first tip portion located distally from the first root portion. The embodiment may further include a first propulsion arrangement positioned between the first root of the first lifting surface, wherein the first propulsion arrangement includes at least one propulsion device movable between a first configuration wherein a thrust vector of the at least one propulsion device is directed substantially vertically downward and a second configuration wherein the thrust vector of the at least one propulsion device is directed substantially horizontally rearward, and a second propulsion device agreement located rearward of the fuselage, wherein a thrust vector of the second propulsion device is substantially collinear with a longitudinal axis at the fuselage.

Yet another embodiment as shown and described herein may further or alternatively include an aircraft that includes an aircraft structure including an aircraft body including a fuselage having a forward end and a rearward end, and a wing structure including a first lifting surface having a first root portion located proximate the aircraft body, and a first tip portion located distally from the first root portion. The aircraft may further include a first propulsion arrangement coupled to the aircraft and including a plurality of propulsion devices substantially aligned with one another along a length of the aircraft structure, wherein at least one propulsion device of the plurality of propulsion devices is movable between a first configuration wherein a thrust vector of the at least one propulsion device is directed substantially vertically downward and a second configuration wherein the thrust vector of the at least one propulsion device is directed substantially horizontally rearward and wherein the thrust vector of the plurality of propulsion devices is horizontally offset from a longitudinal axis of the fuselage, and a second propulsion arrangement coupled to the aircraft structure and having a thrust vector that is substantially collinear with the longitudinal axis of the fuselage.

These and other features, advantages, and objects of the present invention will be further understood and appreciated by those skilled in the art by reference to the following specification, claims, and appended drawings.

DETAILED DESCRIPTION

Figure 1:
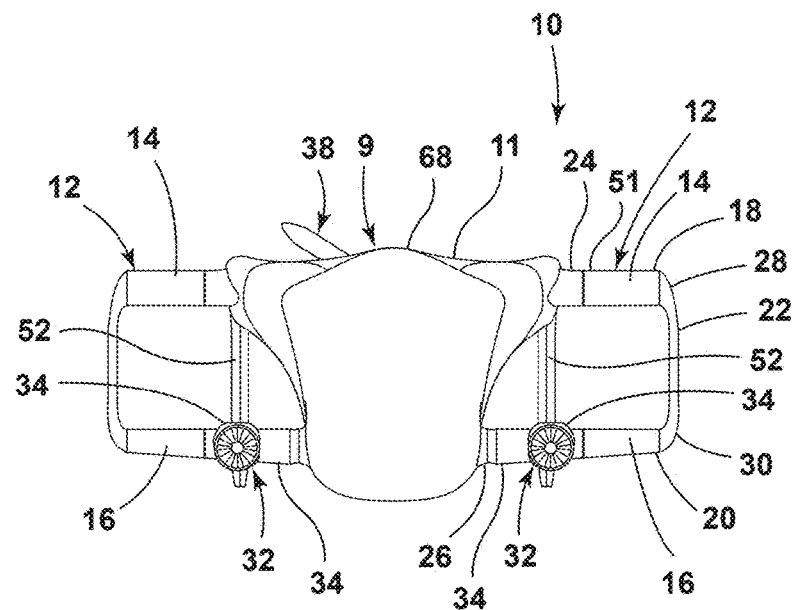
FIG. 1 is a front elevation view of a vertical take-off box wing aircraft.
Figure 2:
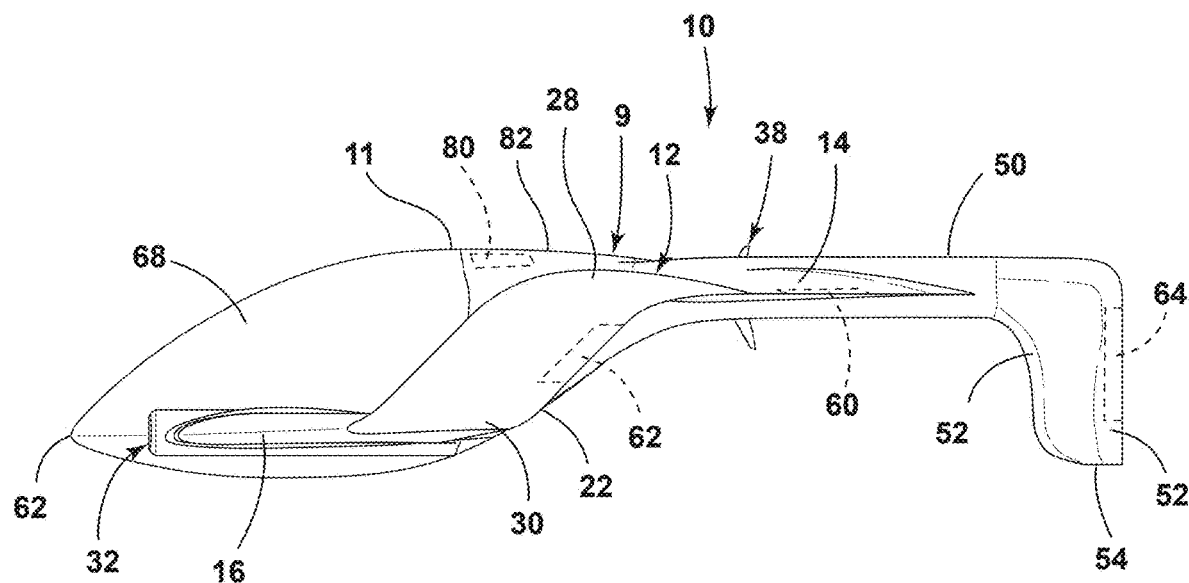
FIG. 2 is a side elevation view of the vertical take-off box wing aircraft.
Figure 3:
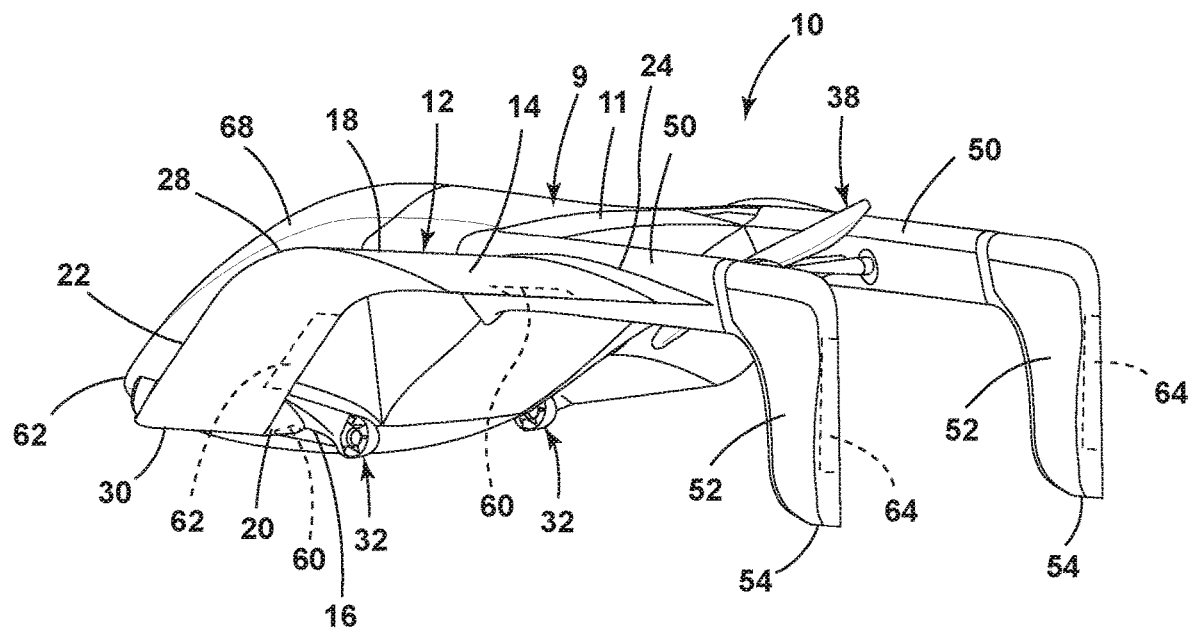
FIG. 3 is a rear perspective view of the vertical take-off box wing aircraft.

For purposes of description herein, the terms "upper," "lower," "right," "left," "rear," "front," "vertical," "horizontal," and derivatives thereof shall relate to the invention as oriented in FIGS. 1 and 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other characteristics relating to the embodiments disclosed herein are not to be considered as limiting, unless the claims expressly state otherwise.

Reference numeral 10 (FIGS. 1-5) generally represents an electric, vertical take-off, horizontal flight aircraft including an aircraft body 9 and hybrid box wings 12 that include two horizontally separated lifting surfaces including an upper lifting surface or wing 14 and a lower lifting surface or wing 16 with opposite sweep and which converge at the wing tips 18, 20 and are connected by a rearward swept vertical connector surface 22. In the illustrated example, the aircraft body 9 includes a fuselage 11 and a pair of extending tail booms 50. Smooth filleted geometry transitions 24, 26 are positioned between the fuselage 11 and the upper and lower lifting surfaces 14, 16 while additional smooth filleted geometry transitions 28, 30 are positioned between the vertical connector surface 22 and the respective upper and lower lifting surfaces 14, 16. In the illustrated example, the overall structure and configuration of the aircraft 10 facilitates the positioning of propulsion in the form of lower propulsion arrangements 32 that may include a singular propulsion device or a plurality of propulsion devices such as a plurality of electric ducted fans (EDF's) 33 (FIGS. 6 and 7) located at the lower wing roots 34 of the lower lifting surfaces 16 and an upper propulsion arrangement 38 which includes two contra-rotating open bladed pusher propellers 40, 42 powered by electric motors 44 located between the rear tail booms 50 where the upper lifting surface 14 terminates into the fuselage 11. The tail booms 50 each terminate into an inverted rudder 52 that also functions to support or house the tailwheel 54 for the overall landing gear arrangement. The overall configuration of the aircraft 10 decreases the required wingspan for a light aircraft to achieve similar lift, and increases the aerodynamic efficiency of the aircraft when compared to one of relatively similar size.

Each box wing 12 includes a respective one of the upper and lower lifting surfaces 14, 16, the lower lifting surface 16 being positioned in front and ahead of the upper lifting surface 14 and swept rearward from the lower wing root 34 to the tip 20, while the upper lifting surface 14 is swept forward from the root 51 to the tip 18. The upper and lower lifting surfaces 14, 16 are connected by the vertical surface 22 with varying degrees of rearward sweep. As noted above, between all perpendicular and connected surfaces may be rounded, filleted geometry transitions, including the transition 24 between the respective tail boom 50 and the root 51 of the upper lifting surface 14; the transition 26 between the fuselage 11 and the lower wing root 34 of the lower lifting surface 16; the transition 28 between the vertical surface and the tip 18 of the upper lifting surface 14; and the transition 30 between the vertical surface 22 and the tip 20 of the lower lifting surface 16. The upper lifting surfaces 14 respectively terminate into the right and left tail booms 50, while the lower lifting surfaces 16 terminate in to the fuselage 11. Both the upper and lower lifting surfaces 14, 16 include airfoils having shapes that may vary in plan view and cross-section. For example, the lifting surfaces 14, 16 may vary in sweep from about 0 degrees to about 60 degrees, where one of lifting surfaces 14, 16 may sweep to match the other in the region of the tips 18, 20. The overall wingspan can be increased or decreased, scaled to any size, affecting the sweep angles, while still maintaining its unique function and advantages.

Control surfaces acting as elevons 60 and/or ailerons may reside on all lifting surfaces of the hybrid box wing 12, such as within the upper and lower lifting surfaces 14, 16. The controls in the horizontal plane can be "mixed" to act as both elevators for pitch control and ailerons for roll control because of the unique, "off center" effect of the hybrid box wings 12. Rudder control surfaces 62, 64 for yaw control may be placed on the vertical surface of the box wings 12 and the inverted rudders for unique flight characteristic and increased safety.

The fuselage 11 of the aircraft 10 fluidly transitions from a low-profile nose section 64, into the lower wing root 34, cockpit 68, eventually diverging behind the cockpit 68 into the twin tail booms 50. The booms 50 may connect at a mounting point the radius of the propeller away from the end of the cockpit 68 for the mounting of the rear assembly, an assembly of counter-rotating propellers used for main horizontal propulsion. Further aft, the tail booms 50 may transition into and terminate into the large inverted rudders 52 which feature the integrated retractable or non-retractable tailwheel 54 as a part of the landing and ground handing assembly.

The landing gear arrangement of the aircraft 10 may include a forward section and an aft section, the aft section having been previously defined in the description of the inverted rudders 52 and the tailwheels 54 integrated therewith. The forward section 68 of the landing gear may be integrated into the fuselage 11, driven by a linear actuator (not shown), and suspended by shocks 70 mounted to a screw driven carriage (not shown) and a lever arm (not shown) of the landing gear.

The propulsion, as discussed above, may be provided in the form of the EDF's (electric ducted fans) 33 and the aforementioned rear assembly, allowing the aircraft 10 to take off and land vertically, while flying horizontally en route. In the illustrated example, the EDF's 33 are positioned at the lower wing roots 34 where the wings 12 connect to the fuselage 11 using a load spar pass-through system 76. The EDF's 33 are operably coupled with the fuselage 11 such that the EDF's may be rotated between a vertical takeoff configuration where the relative thrust vector of one or more of the EDF's is directed substantially downward, and an in-flight configuration where the relative thrust vector of one or more of the EDF's is about 90° from the first configuration and is directed substantially horizontally rearward. It is noted that the EDF's may also be configured to direct the relative thrust vectors that exceed the preferred approximate 90° range as discussed above. Bays of the EDF's 33 may include a plurality of EDF's 33 placed one behind the other in a "series" to form a low drag profile in forward flight or in-flight configuration while rotating 90 degrees to provide vertical lift in the vertical takeoff configuration. Preferably, all propulsion integrated into the airframe of the aircraft 10 may rotate to provide both vertical lift and horizontal thrust. The upper propulsion arrangement 38 may include brushless direct current DC motors (BLDC's) fitted with a traditional propeller or propellers 40, 42, mounted to contra-rotate and provide forward thrust. The upper propulsion arrangement 38 is positioned between the twin tail booms 50 and likewise rotates around a central axis for both forward and vertical flight. It is noted that while EDF's 33 are preferred, alternative propulsion arrangements may be utilized, including but not limited to, jet engines/turbine engines, turbo fans, normally aspirated engines, and the like.

The process of transitioning from vertical flight to forward flight is dependent on mechanisms found at the lower wing roots 34 and inside the twin tail booms 50 which manipulate the EDF's 33 and BLDC's around their central axes respectively. As the aircraft 10 transitions, the rear assembly as well as the EDF's 33 slowly rotate forward, gaining airspeed and becoming parallel with the flight path of the aircraft 10 when the wings have become fully effective at producing the necessary lift to sustain flight.

Figure 4:
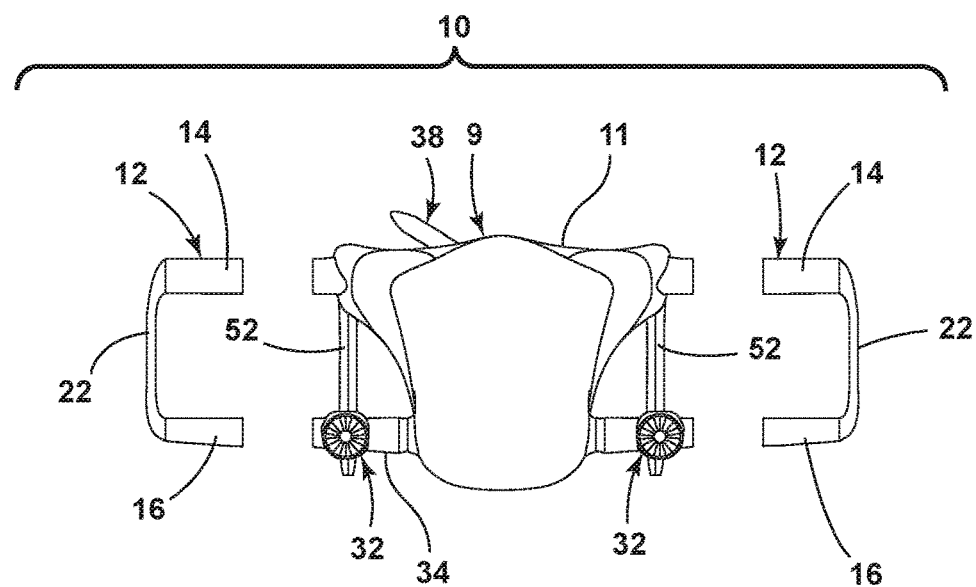
FIG. 4 is an exploded, front elevation view of the vertical take-off box wing aircraft.
Figure 5:
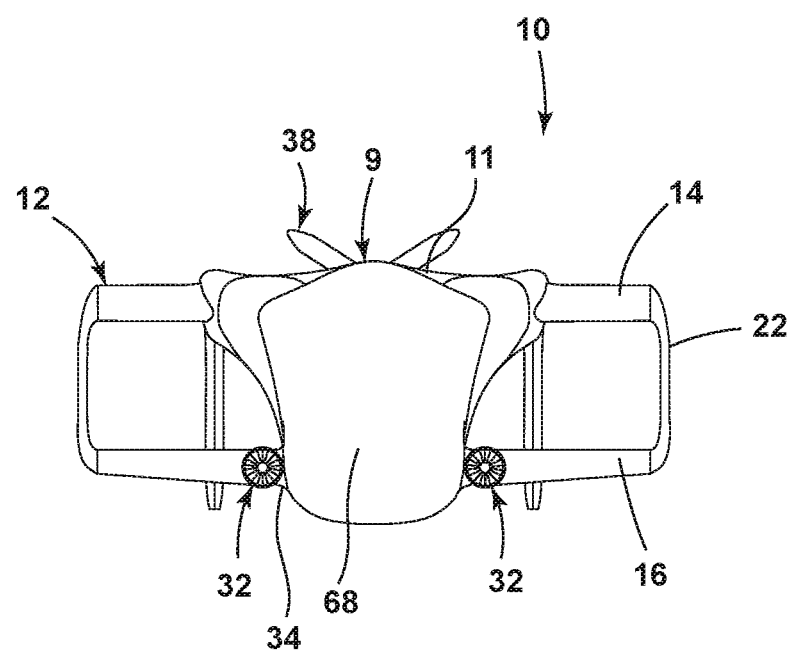
FIG. 5 is a front perspective view of an embodiment of the vertical take-off box wing aircraft.

Modular wings 12, as best illustrated in FIG. 4, may be used to outfit the aircraft 10, in the same general configuration, for improving certain flight characteristics and performance depending on specific requirements. In order to change flight characteristics the aircraft 10 is designed with modular wing functionality, where the spar pass through system 76 may allow a wing 12 to be mechanically disengaged and removed from the aircraft overall 10.

The aircraft 10 may also be configured to house and operate a ballistic recovery parachute 80, integrated into the composite shell 82 of the aircraft 10 and which penetrates through the composite shell 82 on activation, deploy the parachute, and which may suspend the aircraft 10 from hard points on the four upper and lower wing roots (not shown).

Figure 6:
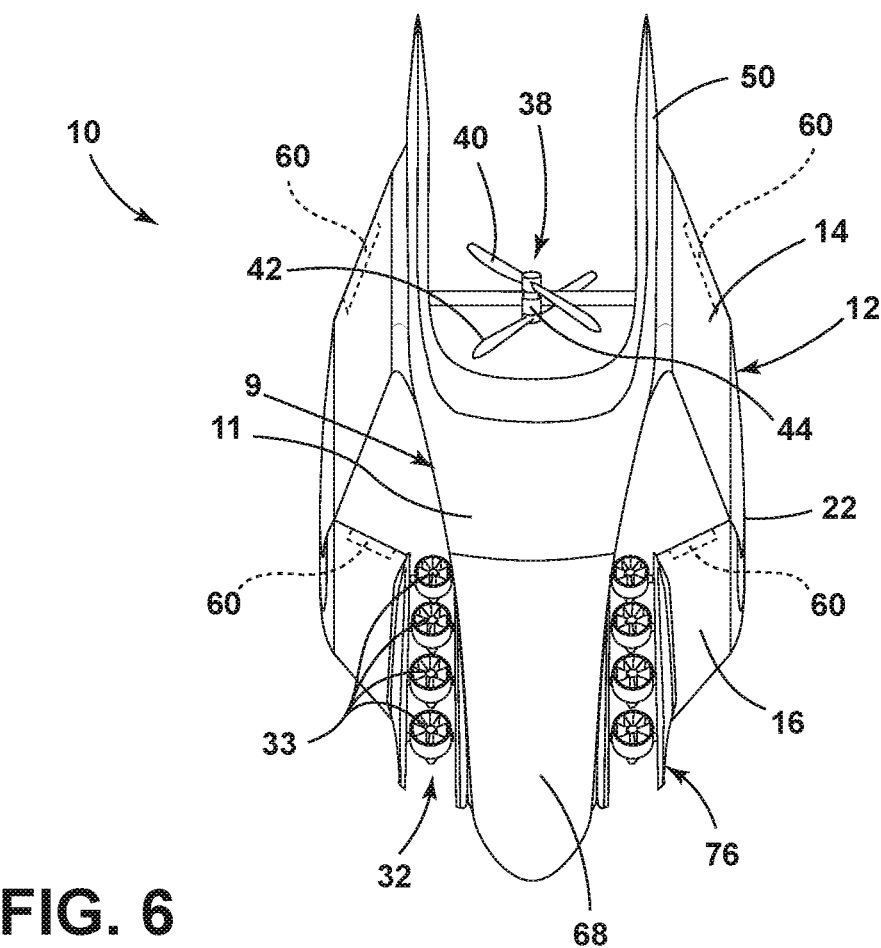
FIG. 6 is a top plan view of the vertical take-off box wing aircraft.
Figure 7:
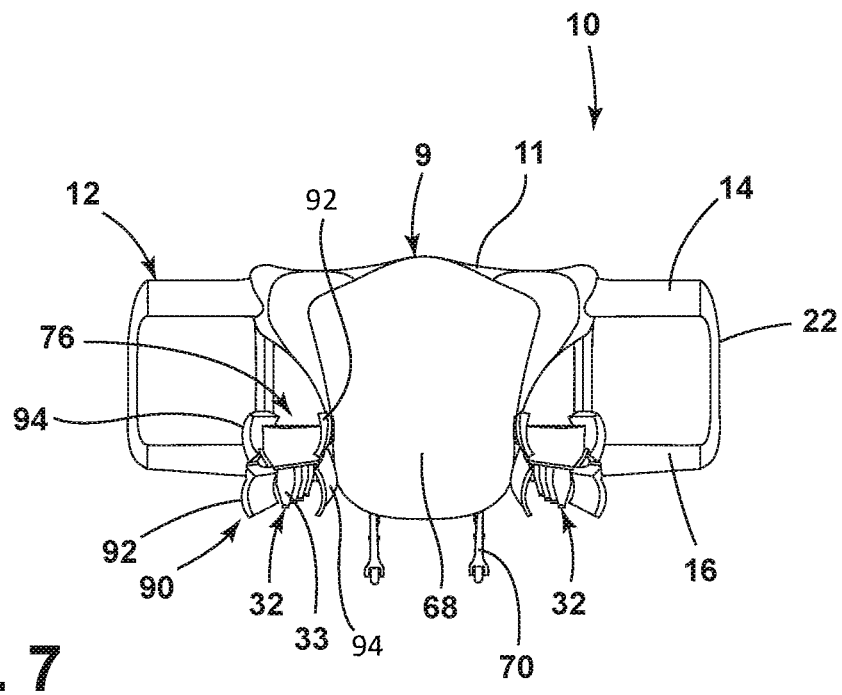
FIG. 7 is a front elevation view of the vertical take-off box wing aircraft.
Figure 8:
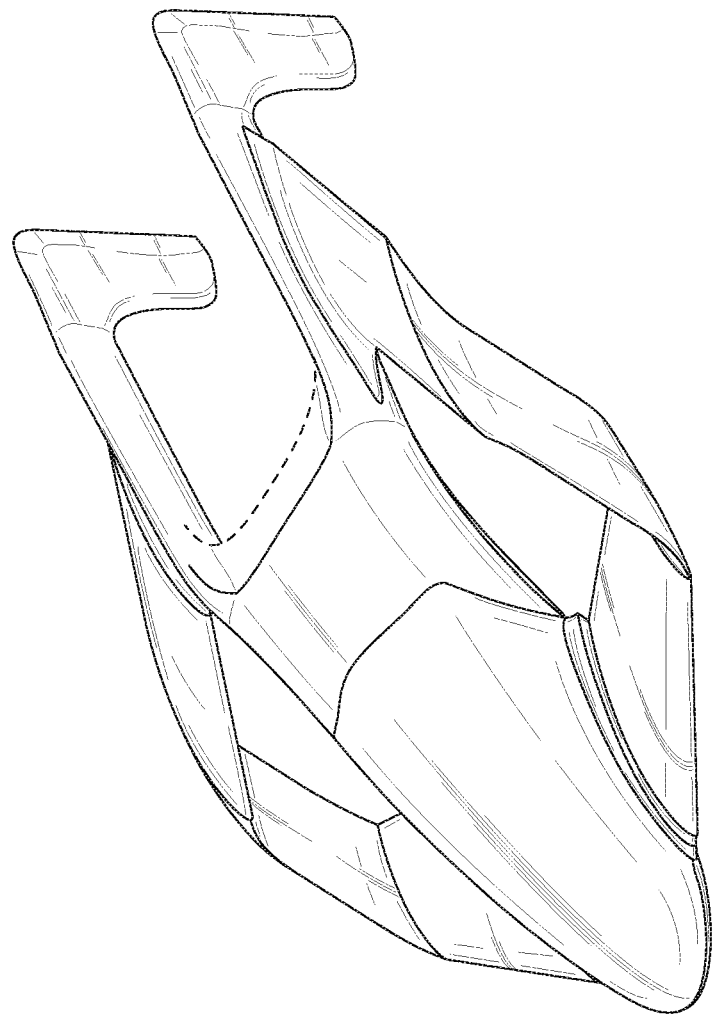
FIGS. 8-15 are top perspective, bottom perspective, front elevation, rear elevation, first side elevation, second side elevation, top plan and bottom plan views of an embodiment of the vertical take-off box wing aircraft.
Figure 9:
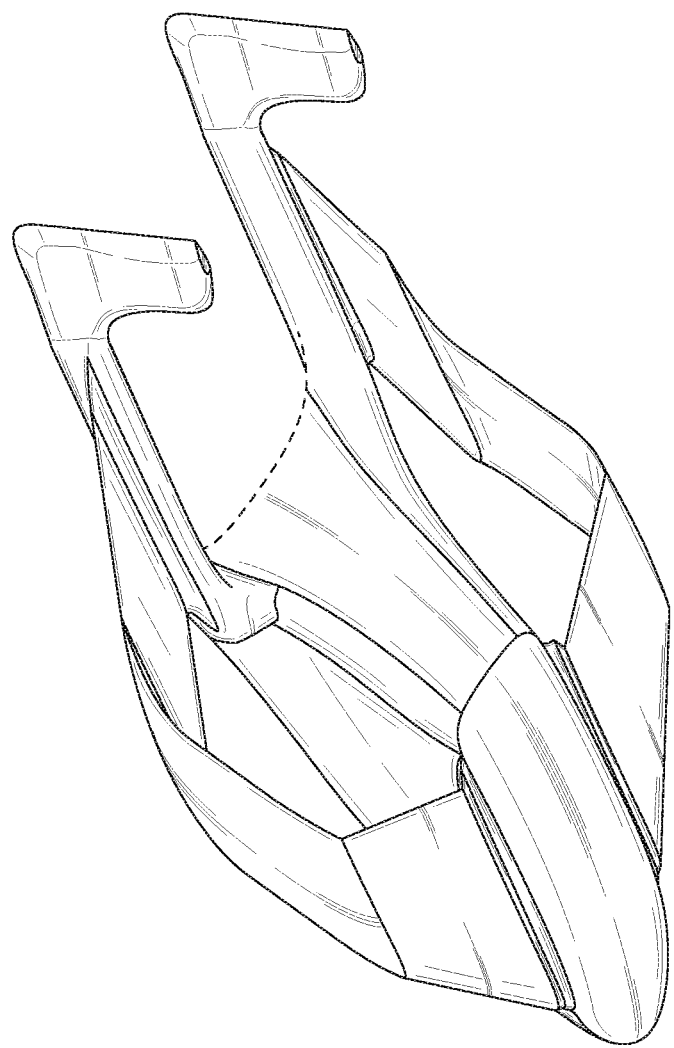
Figure 10:
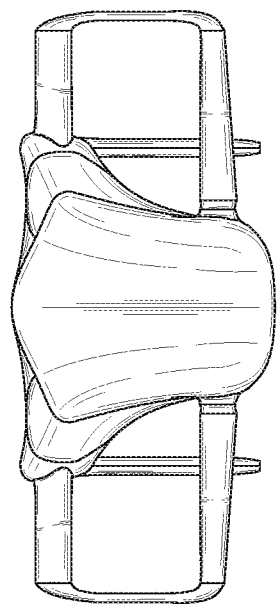
Figure 11:
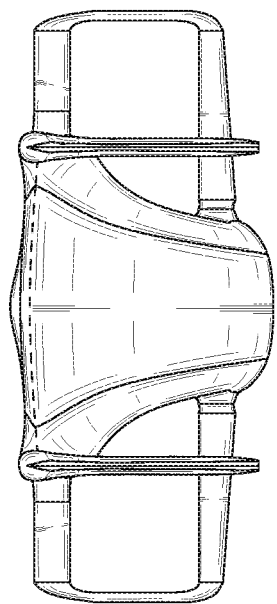
Figure 12:
Figure 13:
Figure 14:
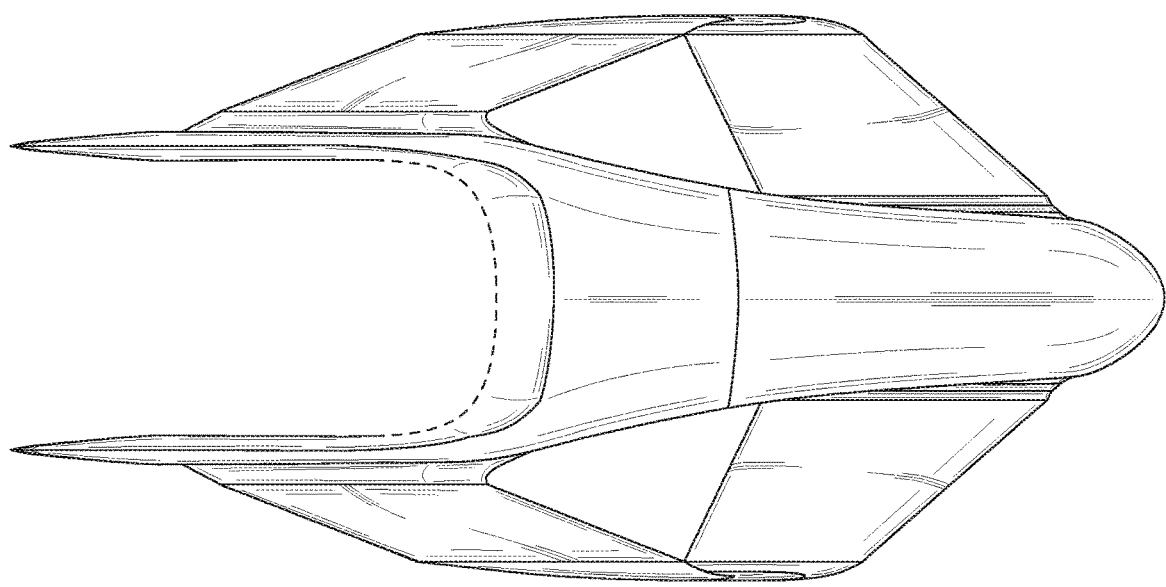
Figure 15:
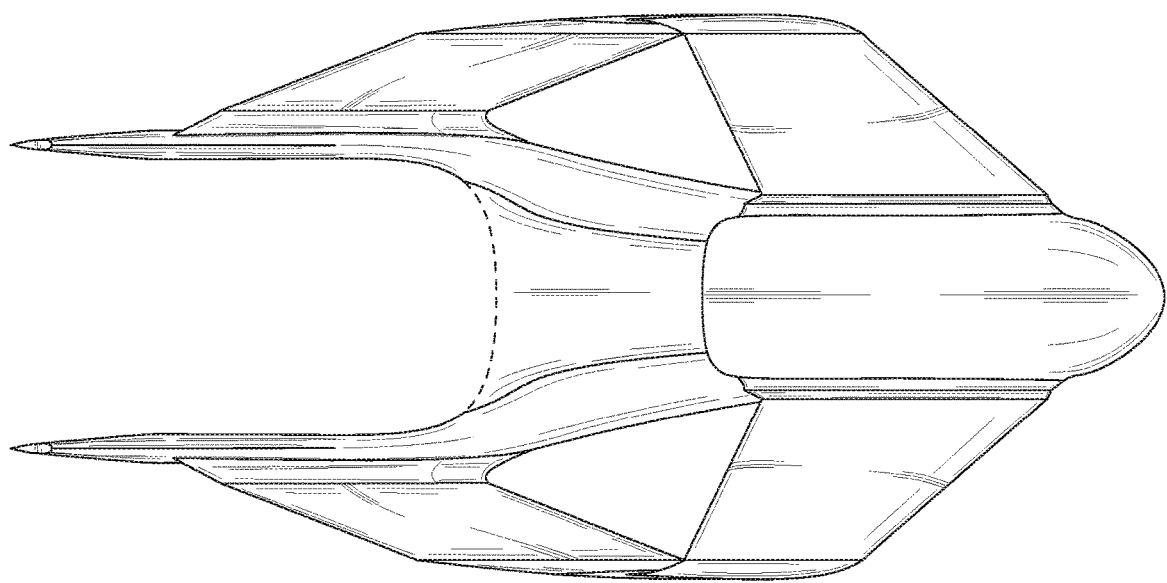

The aircraft 10 may also include a cowling arrangement 90 (FIGS. 6 and 7) including a plurality of upper cowling members 92 and a plurality of lower cowling members 94 each movable between an open position as shown in FIGS. 6 and 7, and a closed position as shown in FIGS. 1-5, where the cowling members 92, 94 are moved to the open position allowing movement of the propulsion devices 33 into the vertical takeoff position, and to the closed position to improve overall aerodynamics during horizontal flight.

In the foregoing description, it will be readily appreciated by those skilled in the art that modifications may be made to the invention without departing when the concept is disclosed. Such modifications are to be considered as included in the following claims, unless these claims by their language expressly state otherwise.

The invention claimed is:

1. An aircraft, comprising:
    an aircraft structure, comprising:
        an aircraft body including a fuselage having a forward end and a rearward end; and
        a wing structure including a first lifting surface having a first root portion located proximate the aircraft body, a first tip portion located distally from the first root portion, a leading edge and a trailing edge; and
    a first propulsion arrangement positioned within the wing structure at the first root portion of the first lifting surface, wherein the first propulsion arrangement includes a plurality of propulsion devices substantially aligned with one another along a length of the aircraft structure, wherein at least one propulsion device of the plurality of propulsion devices is movable between a first configuration wherein a thrust vector of the at least one propulsion device is directed substantially vertically downward and a second configuration wherein the thrust vector of the at least one propulsion device is directed substantially horizontally rearward, and wherein the at least one propulsion device is positioned closer to the leading edge of the first lifting surface than the trailing edge.

2. The aircraft of claim 1, wherein the at least one propulsion device includes an electric ducted fan.

3. The aircraft of claim 1, wherein the plurality of propulsion devices includes a plurality of electric ducted fans.

4. The aircraft of claim 1, further comprising:
    a second propulsion arrangement located rearwardly of the fuselage.

5. The aircraft of claim 4, wherein the second propulsion arrangement includes a push-type propeller.

6. The aircraft of claim 4, wherein the second propulsion arrangement includes a pair of contra-rotating propellers.

7. The aircraft of claim 4, wherein the second propulsion arrangement is operably coupled to the aircraft structure such that the second propulsion arrangement is movable between a third configuration where a thrust vector of the second propulsion arrangement is directed substantially vertically, and a fourth configuration where the thrust vector of the second propulsion arrangement is directed substantially horizontally.

8. The aircraft of claim 1, wherein the wing structure further includes a second lifting surface having a second root portion located proximate the aircraft body, and a second tip portion located distally from the second root portion, wherein the second tip portion is spaced from the first tip portion.

9. An aircraft, comprising:
    an aircraft structure, comprising:
        an aircraft body including a fuselage having a forward end and a rearward end; and
        a wing structure including a first lifting surface having a first root portion located proximate the aircraft body, and a first tip portion located distally from the first root portion;
    a first propulsion arrangement positioned within the wing structure at the first root portion of the first lifting surface, wherein the first propulsion arrangement includes at least one propulsion device movable between a first configuration wherein a thrust vector of the at least one propulsion device is directed substantially vertically downward and a second configuration wherein the thrust vector of the at least one propulsion device is directed substantially horizontally rearward; and
    a second propulsion device arrangement located rearward of the fuselage, where a thrust vector of the second propulsion device is substantially collinear with a longitudinal axis of the fuselage.

10. The aircraft of claim 9, wherein the at least one propulsion device includes an electric ducted fan.

11. The aircraft of claim 10, wherein the at least one propulsion device includes a plurality of propulsion devices.

12. The aircraft of claim 11, wherein the plurality of propulsion devices is aligned along a length of the aircraft structure.

13. The aircraft of claim 11, wherein the plurality of propulsion devices includes a plurality of electric ducted fans.

14. The aircraft of claim 9, wherein the second propulsion arrangement includes a push-type propeller.

15. The aircraft of claim 14, wherein the second propulsion arrangement includes a pair of contra-rotating propellers.

16. The aircraft of claim 9, wherein the second propulsion arrangement is operably coupled to the aircraft structure such that the second propulsion arrangement is movable between a third configuration where a thrust vector of the second propulsion arrangement is directed substantially vertically, and a fourth configuration where the thrust vector of the second propulsion arrangement is directed substantially horizontally.

17. The aircraft of claim 9, wherein the wing structure further includes a second lifting surface having a second root portion located proximate the aircraft body, and a second tip portion located distally from the second root portion, wherein the second tip portion is spaced from the first tip portion.

18. An aircraft, comprising:
an aircraft structure, comprising:
an aircraft body including a fuselage having a forward end and a rearward end; and
a wing structure including a first lifting surface having a first root portion located proximate the aircraft body, and a first tip portion located distally from the first root portion, a leading edge and a trailing edge; and
a first propulsion arrangement coupled to the aircraft structure and including a plurality of propulsion devices substantially aligned with one another along a length of the aircraft structure, wherein at least two propulsion devices of the plurality of propulsion devices are movable between a first configuration wherein a thrust vector of each of the at least two propulsion devices is directed substantially vertically downward and a second configuration wherein the thrust vector of each of the at least two propulsion devices is directed substantially horizontally rearward and wherein the thrust vector of the plurality of propulsion devices is horizontally offset from a longitudinal axis of the fuselage, and wherein the at least two propulsion devices of the plurality of propulsion devices are located rearward of the leading edge and forward of the trailing edge; and
a second propulsion arrangement coupled to the aircraft structure and having a thrust vector that is substantially collinear with the longitudinal axis of the fuselage.

19. The aircraft of claim 18, wherein the at least one propulsion device includes an electric ducted fan.

20. The aircraft of claim 18, wherein the plurality of propulsion devices includes a plurality of electric ducted fans.

21. The aircraft of claim 18, wherein the second propulsion arrangement includes a push-type propeller.

22. The aircraft of claim 18, wherein the second propulsion arrangement includes a pair of contra-rotating propellers.

23. The aircraft of claim 18, wherein the second propulsion arrangement is operably coupled to the aircraft structure such that the second propulsion arrangement is movable between a third configuration where the thrust vector of the second propulsion arrangement is directed substantially vertically, and a fourth configuration where the thrust vector of the second propulsion arrangement is directed substantially horizontally.

* * * * *